United States Patent [19]

Lehtinen

[11] 4,244,393

[45] Jan. 13, 1981

[54] SHUT-OFF VALVE

[76] Inventor: Kari Lehtinen, Pikikatu 6,, 04400 Järvenpää, Finland

[21] Appl. No.: 929,492

[22] Filed: Jul. 31, 1978

[51] Int. Cl.³ .................. F16K 13/02; F16K 25/00
[52] U.S. Cl. ............................... 137/240; 137/559; 137/614.11; 251/185
[58] Field of Search ............... 137/240, 312, 614.11, 137/625.46; 251/161, 182, 185, 176

[56] References Cited

U.S. PATENT DOCUMENTS

| | | | |
|---|---|---|---|
| 1,724,016 | 8/1929 | Godfrey | 137/312 X |
| 2,075,460 | 3/1937 | Parker | 251/182 |
| 3,854,497 | 12/1974 | Rosenberg | 137/559 X |
| 4,073,471 | 2/1978 | Lehtinen | 251/185 X |

*Primary Examiner*—Martin P. Schwadron
*Assistant Examiner*—Richard Gerard
*Attorney, Agent, or Firm*—J. Harold Nissen

[57] ABSTRACT

The present invention concerns a shut-off valve comprising a valve body with at least two flow ports, two shutters and a turning shaft. Said shutters are placed opposite each other on an annular spring which forms the lower part of the turning shaft and by means of which the shutters are pressed against and carried along the inner surface of the valve body, or housing, closing simultaneously said two flow ports. The spring is further braced against the bottom of the valve body, or its tensioning device, in the axial direction of the turning shaft.

6 Claims, 3 Drawing Figures

SHUT-OFF VALVE

BACKGROUND OF THE INVENTION

In the foodstuff industry strict requirements are imposed on valves especially as regards the cleanability and hygiene of the valve, in addition to conventional, structural and quality requirements. At present a great variety of valves are known for use in connection with the handling of different kinds of foodstuffs under various conditions. A recent development in this branch is represented by the valve disclosed in the U.S. Pat. No. 4,073,471, intended for use in handling foodstuffs, which is easy to clean in place and to control, in which endeavours have been taken to eliminate flow resistance, and in which the tightening of the valve may be conveniently accomplished by using a special tightening means.

Especially in certain countries the provisions concerning handling of foodstuffs raise problems which have not up to date found any satisfactory solution in spite of development work done. The washing of foodstuffs pipe systems in particular causes problems because the respective foodstuff liquid and the washing liquid, such as caustic solution for instance, have to be separated by at least two valves in order to safeguard against intermixing of liquids. So major economic values are also involved since even the smallest amount of washing liquid entering the foodstuff liquid through a leaking valve might spoil the product simultaneously in process. It follows that as a rule certain pipe systems have to be built using a unit of two valves as a basic building element to minimise the probability of the mixing of foodstuffs and e.g. washing liquids. This naturally implies considerably increased initial costs as well as increased operating and maintenance costs.

The cause responsible for the drawback mentioned is that no one has so far been successful in developing a hygienic as well as economic shut-off valve for foodstuff liquids in which positively no leaks would occur, and in which the leaks occurring could be observed e.g. in the washing situation, when the valve separates the foodstuff from the washing solution.

The object of the present invention is to eliminate the drawbacks mentioned above. The features characterized of the invention have been presented in the claims.

SUMMARY OF THE INVENTION

The valve is specially designed for hygienic food industry applications wherein single conventional butterfly, flap, etc. valves of the named industry are not safe enough and wherein ball and cock type constructions are not even hygienically satisfactory for cleaning in place(C.I.P.)installations.

Due to the invention the two flow ports of the valve are shut-off, closed by two separate shutters, whereby the closing and the safeness as to leakage of the valve is ascertained.

Further, as the annular spring controlling the tightness of the shutters is supported only in the vertical direction at the bottom of the valve, tightness at one shutter is increased in case, due to high pressure against the opposite shutter, leakage occurs at this latter port.

The advantages of the construction are enhanced if the valve body is provided with an inspection aperture with a sight glass, or without such glass, through which possible leaking of either or both ports can be observed.

In the event of leakage, the fluid that has leaked out may also escape through the said aperture so that no pressure is built up inside the valve in its closed position.

When using the valve according to the invention, foodstuff liquid and e.g. washing solution can safely enough be separated with the aid of single valves in critical process connections and yet satisfy the specific safety provisions imposed on food processing plants in certain countries.

DETAILED DESCRIPTION OF PREFERRED EMBODIMENTS

Figure 1:
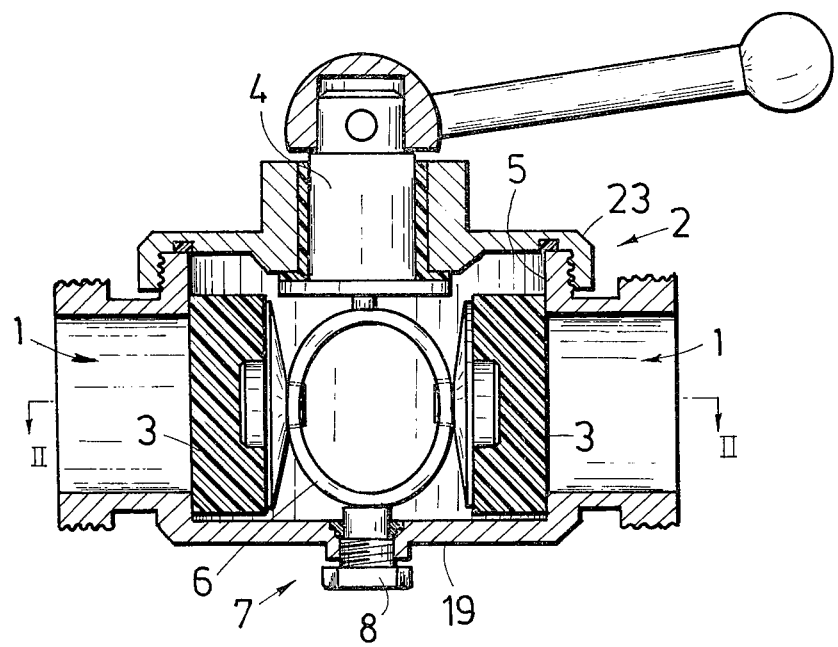
Figure 2:
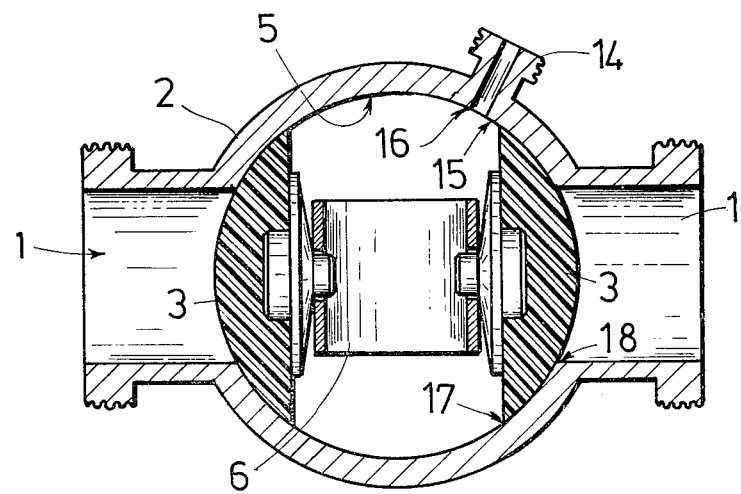
Figure 3:
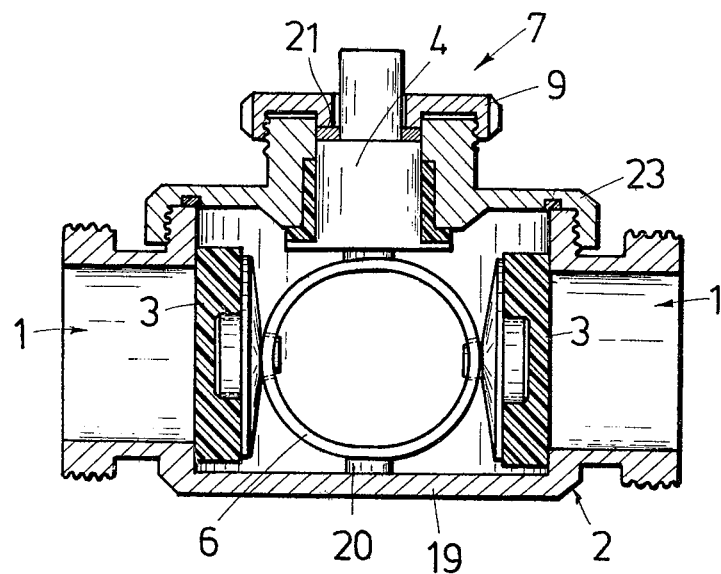

The invention is described in the following in detail, with the aid of embodiment examples and with reference to the attached drawings, wherein:

FIG. 1 presents, in elevational and sectioned view, a shut-off valve according to the invention, FIG. 2 presents the section along line II—II in FIG. 1, and FIG. 3 presents another shut-off valve according to the invention, similarly in sectional elevational view.

The valve depicted in FIG. 1 comprises a valve body 2, forming a valve housing provided with two flow ports 1, two shutters 3, and a turning shaft 4 with its annular spring part 6, to which the shutters made of resilient material have been attached opposite each other, shifted 180 degrees in phase so that the flow ports may be closed simultaneously by the respective shutters, by turning the operating shaft. The valve furthermore comprises a tightening means 7 consisting of the tightening screw 8, attached to the bottom of the valve body 2, with the aid of which the shape of the spring 6 and thereby the tension pressing the shutters 3 against the inner surface 5 of the valve body may be controlled. In FIG. 2, which presents the same valve as FIG. 1, there is seen a rinsing and/or inspection aperture 14, through which the valve housing may be rinsed, and through which one may check whether leakage passes into the valve housing from either flow port closed by the two shutters 3. Such leakage may be observed e.g. as fluid drops from the aperture 14, or by visual observation through a sight glass provided to protect the aperture. The rinsing and/or inspection aperture 14 is placed close to shutter 3 so that the shutter at any time closes either the adjacent port 1 or said rinsing aperture. This is positively ensured by the circumstance that the margin 15 of the shutter 3 closing the washing aperture 14 has a shorter distance from the outer margin 16 of the washing aperture than is the distance of the same shutter's opposite margin 17 from the near margin of the respective flow port 1. Hereby when the valve is opened the liquid getting access in the valve housing from flow port 1 cannot escape through the washing aperture 14 in any rotational position of the shaft. Similarly, in closed position, the rinsing fluid introduced through the washing aperture into the valve housing cannot penetrate to the flow port and to ie pipe system thereto attached.

In FIG. 3 an embodiment of the invention is shown wherein the shutters 3 have been attached to the turning shaft 4 by the aid of an annular tightening spring 6 abutting on a support member 20 provided on the bottom 19 of the valve body, similarly as in FIGS. 1 and 2. The tightness of the tightening spring 6 against the ports 1 may be controlled by means of the tightening means 7, which consists of a flange 9 attached by threads to the valve body 2 and against which the spring 6 rests through the intermediation of the shoulder on the turning shaft 4, and whereby the turning shaft is displaceable in its axial direction with reference to the valve body by the aid of said flange 9. Rotation of the flange 9 along with the turning shaft 4 is prevented by the non-rotatable washer 21 placed between the flange and the shoulder of the turning shaft.

In the embodiment of FIG. 3 the spring 6 has been braced against the bottom of the valve body in the axial direction of the turning shaft in such manner that the part of the spring abutting on the bottom of the valve body may move with reference to the bottom in a radial direction relating to the turning shaft. The bracing member of the bottom 19 of the valve body 2, or the bottom against which the tightening spring 6 rests, is substantially level The spring 6 with the shutters 3 will then be automatically balanced because the spring is not supported by the support member 20 nor by the bottom of the valve body 2 in a direction relative to the normal of the turning shaft 4, or in a radial direction relative to said turning shaft. The turning shaft has been attached to the annular spring part 6 in a radial direction relative to the turning shaft, the shutters also being attached to the spring 6 radially, but in a normal direction relative to the turning shaft.

In the embodiment examples presented, the inner surface 5 of the valve body 2 consists of a cylinder surface, in which the flow ports have been made. The surfaces of the shutters urging against the inner surface 5 of the valve body 2 are consistent as to their shape with the shape of said inner valve body surface and therefore they constitute, in the embodiments presented, part of a cylinder surface. Naturally, the inner surface of the valve body 2 may equally be shaped to conform to the surface of a circular cone, part of a sphere, e.g. of a spherical segment, or in general any straight rotational surface or part thereof.

The use of the valve of the invention may be arranged to take place manually or by the aid of hydraulically or mechanically operating actuator, known in themselves in prior art. The valve may further comprise limit stops which prevent any opening of the valve in undesired rotational direction. Furthermore, the valve may comprise three or four flow ports, i.e. the valve may serve as a kind of three- or four-way valve. There may also be two rinsing and/or inspection apertures 14 in the valve, whereby rinsing of the interior of the valve is easily accomplished by a rinse-through operation.

The usability of the valve of the invention is enhanced by the symmetrical load imposed on the shutters and turning shaft, which is due to the previously described balancing effect on the spring.

The invention is not confined to the examples presented, and its embodiments may vary within the scope of the claim following below.

What I claim is:

1. A shut-off valve, comprising a valve body provided with at least two flow ports, two shutters and an operating shaft part of which employs a closed annulus, on the periphery of which said shutters are attached opposite each other for closing and opening said two flow ports simultaneously, the first flow port by means of the first shutter and similarly the second flow port by means of the other shutter, by turning the operating shaft; said ring member specifically being a spring which has been arranged to urge said shutters against the inner surface of said valve body and which rests against the bottom of said valve body primarily in the axial direction of said operating shaft;

said annulus being braced against said bottom of said valve body in axial direction only so that the part of said annulus resting against said bottom of said valve body is free to move with reference to said bottom in radial directions relative to said shaft, thus balancing the shutter pressures, and said bottom being substantially level, said spring and said shutters being automatically balanced and being free of support from said bottom of said valve body in the direction of the normal of said operating shaft and in the radial direction of said operating shaft so that said annulus is free to move in all radial directions normal to said operating shaft; and said valve also being provided with an adjustable tensioning device for regulating the tension of said shutters against the inner surface of said valve body.

2. A shut-off valve as claimed in claim 1, the valve body comprising at least one rinsing aperture for the rinsing of the interior of the valve while the valve is closed.

3. A shut-off valve as claimed in claim 2, the improvement further comprising that the rinsing aperture has been arranged to be close to a shutter so that the shutter always closes either one flow port or alternatively the rinsing aperture.

4. A shut-off valve as claimed in claim 1, the valve body comprising an inspection aperture for the inspection of the valve interior.

5. A shut-off valve as claimed in claim 1, wherein said annulus is attached to said operating shaft in the radial direction of said annulus and said shutters are also attached to said annulus radially, but in a direction normal to said operating shaft.

6. A shut-off valve as claimed in claim 5, including a support member on the bottom of said valve body, said annulus abutting on said support member.

* * * * *